United States Patent Office 2,985,622
Patented May 23, 1961

2,985,622

CASHEW NUT SHELL LIQUID MATERIAL MODIFIED EPOXY RESIN COMPOSITIONS

John E. Leppert, Scotch Plains, N.J., assignor to Colloid Chemical Laboratories, Incorporated, Cedar Knolls, N.J., a corporation of New Jersey No Drawing. Filed May 1, 1957, Ser. No. 656,208

6 Claims. (Cl. 260—46)

The present invention relates to novel epoxy resin compositions and to a process for preparing the same. More specifically, the invention relates to modified epoxy resin compositions having improved physical and chemical characteristics and to a method for preparing these compositions.

It has been discovered that the use of Anacardiaceae materials as modifiers for epoxy resins results in numerous improvements in the resulting resin compositions. Improved flexibility, lowered viscosity and lower exotherm during cure are available with the proper selection of the aforesaid Anacardiaceae material. Moreover, I have discovered that the cure may be either accelerated or retarded merely by proper selection and amount of the aforesaid material.

Glycidyl ethers prepared from certain Anacardiaceae materials are known to the art. Wasserman, U.S. 2,665,266, for example, discloses the use of cardanol, together with another phenol and epichlorhydrin, to prepare glycidyl ethers.

The present invention, however is distinct from that of Wasserman. The problems attacked are distinct; the properties claimed for the products and compositions of the two inventions are distinct.

Wasserman sought a glycidyl ether which could be processed economically. The successful use of low-cost solvents with his glycidyl ethers is an advantage claimed by Wasserman.

The problem attacked in the present invention was the formulation of a standard commercial epoxy resin into a modified composition with improved flexibility and reduced viscosity, as well as good casting characteristics.

According to the present invention, a mixture of the epoxy resin and the Anacardiaceae material is prepared. Conventional curing agents may be incorporated at the time of preparing the aforesaid mixture or at the time of use depending upon the particular formulation and upon the application for which it is intended.

Products useful for chemically resistant coatings, laminations, castings, potting compositions and flexible coatings may be prepared according to the present invention.

The initial materials for practicing the present invention are Anacardiaceae materials, epoxy resins and curing agents.

The Anacardiaceae materials suitable for use herein include generally materials obtained from the nut shells, nut pericarps or incised trunks of plants belonging to the family Anacardiaceae. An example of such a plant is the cashew tree (Anacardium occidentale), whose materials are used herein as representative of the widely known commercially available Anacardiaceae materials. Anacardiaceae materials include bhilawan shell liquid and marking shell liquid. The latter two liquids are composed mainly of dihydroxy benzenes having a $C_{15}$ or $C_{17}$ straight unsaturated side chain. Also included herein as Anacardiaceae materials are cashew nut shell liquid and its acylated derivatives.

The preparation of cashew nut shell liquid (CNSL) and its derivatives is known to the art and is not a part of the present invention. While the preparation of the aforesaid derivatives of CNSL is disclosed generally in such prior art patents as Caplan, U.S. 2,181,119, and Novotny et al., U.S. 2,401,095, a brief description of said preparation is given herein in the interests of completeness.

Cashew nut shell liquid occurs naturally in the husk of the fruit of the cashew tree (Anacardium occidentale). In consists chiefly of compounds of the general structural formula:

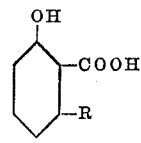

where R is a 15-carbon straight, unsaturated chain with from 0 to about 3 double bonds per chain. These compounds are known collectively as anacardic acid. Also present in the aforesaid fluid is about 10% of cardol, a dihydroxy benzene of the general structural formula:

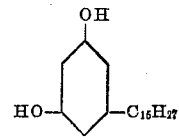

The CNSL of commerce is obtained by extracting the oil from the husks in a hot bath of previously extracted oil. During the hot extraction most of the anacardic acid is decarboxylated. Moreover, some polymerization occurs, so that the extracted CNSL consists mostly of monophenolic olefins with a carbon skeleton of 3-pentadecyl phenol. Small amounts of cardol, anacardic acid, polymers and husk contaminants are also present. The aforementioned commercial material is an oily, dark brown liquid with a following typical analysis:

Specific gravity at 77° F. _____ .960
Iodine value (Wijs) _____ 240
Polymerization time _____min.___ 4
Viscosity at 77° F. _____cps.___ 450
Moisture _____percent___ 0.4

Detoxicated CNSL is prepared by heating the aforesaid commercial material with agents such as fluoboric acid, sulphuric acid, phosphoric acid, hydrochloric acid, diethyl sulphate, or the like in order to eliminate a toxic effect analogous to that of poison ivy and to purify the oil by precipitation of an undefined sludge.

Polymerized CNSL is prepared by heating the oil in the presence of the aforementioned detoxicating agents, which act as catalysts. For this purpose a temperature higher than that required for detoxication or an increased heating interval or both will be used. Although heating in the absence of a catalyst will induce polymerization, the time requirement renders such a process impractical.

CNSL may be distilled either at reduced pressure or at atmospheric pressure, with or without steam. The distillate may range from about 1% to about 75% and the residue may range from about 25% to about 99%. The starting oil may be either raw CNSL or detoxicated CNSL.

The term, cashew nut shell liquid or CNSL, is used herein in accordance with its art-recognized significance.

The acyl derivatives of CNSL are also useful in the present invention. The acetyl derivative, for example, may be prepared by refluxing a large excess of acetic anhydride with the CNSL selected for the reaction.

A typical preparation of acetyl CNSL follows:

217 gms. of acetic anhydride and 508 gms. of CNSL distillate, prepared by distilling raw CNSL at 10 mm.

Hg until the distillate is equal to 25% of the charge, is heated in a flask equipped with a thermometer and a reflux condenser. The mixture is refluxed 2 hours at 282° F.–288° F.

The contents of the flask are then added to 250 cc. of water in a separatory funnel. After vigorous shaking, the material is allowed to settle. The water layer is removed. Extraction with water is continued to a pH of about 6–7 in the aqueous layer.

Approximately 30 gms. of anhydrous sodium sulphate is added to complete the removal of water from the product. The sodium sulphate is then removed by filtration.

The acetyl derivative, as obtained after filtering off the aforementioned salt, is satisfactory for use as an epoxy resin modifier. The derivative may be purified further by distillation and as so purified is also satisfactory for use as an epoxy resin modifier.

Another well known procedure for preparing acyl derivatives is that of reacting the CNSL with acyl halides such as acetyl chloride or benzoyl chloride.

The epoxy resins may be any of the several conventional commercially available epoxy resins, either liquid or solid. They may be represented by the general structural formula:

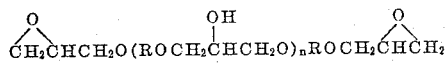

where $n$ has a value of from 0 to about 10, and R is an organic radical including, e.g., aromatic hydrocarbon radicals, and alkylated aromatic hydrocarbon radicals and hydroxyalkylene-substituted aromatic nuclei.

The preferred epoxy resins for practicing the present invention are those of the structural formula:

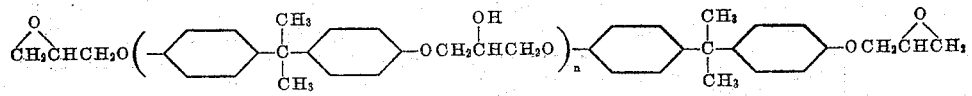

in which $n$ has a value of from 0 to about 10.

Among those epoxy resins suitable for use in the present invention are Epons, 562, 815, 820, 828, 834, 864, 1001 and 1007, supplied by Shell Chemical Corporation; Araldite 502, supplied by Ciba Pharmaceutical Products, Inc.; and ERL 2774, supplied by the Bakelite Division 1 of Union Carbide and Carbon Corporation. Each of these resins, except Epon 562 is a glycidyl ether of bisphenol A and epichlorohydrin of the formula in the immediately preceding paragraph for the preferred epoxy resins. Epon 562 is aliphatic based rather than aromatic based. The composition of these resins is indicated in the following Table I. In this table, "Shell" refers to Shell Chemical Corporation, "Ciba" to Ciba Pharmaceutical Products, Inc. and "Bakelite" to Bakelite Division of Union Carbide and Carbon Corporation.

TABLE I

| Resin | Company | Epoxide Equiv. | Ave. Mol. Net | Melting Point |
|---|---|---|---|---|
| Epon 562 | Shell | 140–165 | 300 | Liq. |
| Epon 815 | do | 175–210 | 340–400 | Liq. |
| Epon 820 | do | 175–210 | 350–400 | Liq. |
| Epon 828 | do | 175–210 | 350–400 | Liq. |
| Epon 834 | do | 225–290 | 450 | Liq. |
| Epon 864 | do | 300–375 | 700 | 40–50° C. |
| Epon 1001 | do | 450–525 | 900–10,000 | 64–76° C. |
| Epon 1007 | do | 1,650–2,050 | 2,900 | 125–132° C. |
| Araldite 502 | Ciba | | 250 | Liq. |
| ERL 2774 | Bakelite | 185–200 | 350–400 | Liq. |

In the practice of the present invention, the Anacardiaceae material is employed in proportions from about 1 part to about 100 parts per 100 parts by weight of epoxy resin. It is preferred to employ an amount of about 40 to about 60 parts of such material, e.g., CNSL or acyl derivatives thereof such as acetyl CNSL, per 100 parts by weight of epoxy resins.

The Anacardiaceae-modified resins may be cured by any of the conventional curing agents for epoxy resins, such as amines, acid anhydrides, dibasic acids, heat-reactive phenolics and polyamides. Advantageous results have been obtained with amines and amides. Amine curing agents, such as triethylenetramine, are preferred to cure epoxy resins—CNSL or acetyl CNSL compositions.

Each epoxy resin system, consisting of epoxy resins, modifiers (such as plasticizers, diluents, bodying agents, fillers, etc.) and curing agents, has a specific curing procedure. The experienced formulator selects the components of his system to meet his application and end product specifications. For the more common epoxy resin-curing agent systems, recommended amounts of curing agent and procedures for curing have been established. These may be altered within limits to suit specific applications. The addition of modifiers may affect the cure of a given system. The formulator must adjust the system to compensate for the change.

Generally, I have found that when CNSL is used, no increase in the quantity of curing agent above that recommended for the epoxy resin is required. For example, if 100 parts of an epoxy resin requires 10 parts of an amine curing agent, then 100 parts of the epoxy resin plus 50 parts of CNSL requires 10 parts of the amine curing agent.

When the acyl derivative of CNSL is used, however, I have found that an additional amount of curing agent proportional to that used for the epoxy resin is required. For example, if 100 parts of an epoxy resin requires 10 parts of an amine curing agent, then 100 parts of the epoxy resin plus 100 parts of an acyl derivative of CNSL require 20 parts of the amine curing agent.

In general, the addition of CNSL to an amine cured epoxy system will accelerate the cure while reducing the exothermic characteristics. Similarly, the acyl derivative, when used in concentrations up to approximately 50 parts per 100 of epoxy resin, will accelerate the cure while reducing the exothermic characteristics. Above this concentration, on the other hand, the acyl derivative will retard the cure while lowering the exotherm.

It must be remembered that the curing of epoxy resins is normally an exothermic reaction. Therefore, the size of the batch has a pronounced effect on the exothermic buildup. The aforementioned exothermic properties in turn influence both the rate of cure and the properties of the cured resin. In the generalizations given relative to the differences in behavior between the CNSL and the acyl derivatives prepared therefrom, batches of 25 gms. to 50 gms. were used.

The following specific examples are illustrative merely and are not to be considered as restricting the present invention.

*Example 1*

| | Gms. |
|---|---|
| Epon 828 | 20 |
| Acetylated CNSL distillate | 10 |
| Triethylenetetramine | 3.3 |

The epoxy and CNSL were stirred until solution was complete. The amine was stirred in and the mix was poured into a mold treated with silicone mold release. The resin set to a hard, slightly flexible condition in about 20 minutes at room temperature. Optimum properties were reached in about 5 days to about 10 days. It was found that the epoxy-acetyl mix could be stored as a unit and that the amine could be added at the time of use.

The formulation proved useful as a casting resin (e.g., for tool and die applications), in potting of electrical components and in laminating applications. As a laminating resin, curing was slower, presumably because of differences in exposed surface and in resultant heat dissipation.

Example II

| | Gms. |
|---|---|
| Epon 828 | 15 |
| Acetylated CNSL distillate | 15 |
| Triethylenetetramine | 3.3 |

The mixture was prepared as in Example I. The cured resin was considerably softer and more flexible than that in the preceding example.

The resin formulation was useful in flexible coating applications such as can liners and wire coatings and in flexible laminations.

Example III

| | Gms. |
|---|---|
| Epon 1001 | 40 |
| Acetylated CNSL | 10 |
| Diethylenetriamine | 12 |

The epoxy and CNSL were heated to 450° F. On cooling, the resin was a clear, viscous liquid. The resin was thinned to from about 40% to about 60% solids with a solvent mixture consisting of equal proportions of methyl ethyl ketone, toluene and xylene. At the time of use, the amine was added.

The composition proved useful as a chemically resistant coating for tank and can linings, laboratory equipment, etc. The finish was set to touch in 16 hours and had optimum properties in 10 days.

Example IV

| | Gms. |
|---|---|
| Epon 828 | 20 |
| CNSL distillate | 10 |
| Triethylenetetramine | 2.2 |

The resin and CNSL were mixed thoroughly. The amine was added at the time of application. The resin was set hard to touch in 10 minutes and had optimum properties in 10 days. Although this formulation was slightly less flexible than that of Example I, it was useful for the same types of applications.

Example V

| | Gms. |
|---|---|
| Epon 828 | 20 |
| Raw CNSL | 10 |
| Diethylaminopropylamine | 3.6 |

The resin and CNSL were mixed thoroughly. The amine was added at the time of use. The resin was set hard to touch in 4 hours and had optimum properties in 10 days. It was a hard, somewhat brittle resin, less brittle than a similar resin unmodified by CNSL. It proved useful for applications such as those indicated in Example I.

Example VI

| | Gms. |
|---|---|
| Epon 828 | 23 |
| Detoxicated CNSL | 12 |
| Liquid polyamide [1] | 15 |

[1] For example, Versamid 115, General Mills, Inc. Versamid 115 is a viscous liquid resin at room temperatures, and is prepared by the condensation of polymerized linoleic acid with polyamines.

The three ingredients were thoroughly mixed. The formulation required baking for 1 hour at 325° F. in order to effect cure.

The cured resin was hard and flexible. It was useful for applications such as those described in Example I. On thinning, as in Example III, the formulation was useful as a protective coating.

Example VII

| | Gms. |
|---|---|
| Epon 1001 | 20 |
| Acetylated CNSL distillate | 5 |
| Diethylenetriamine | 2.4 |

The epoxy and CNSL were heated to 450° F. On cooling, the resin was a clear, viscous liquid. The resin was thinned to 50% solids with a solvent mixture consisting of equal proportions of methyl ethyl ketone, toluene and xylene. At the time of use, the amine was added.

The composition proved useful as a chemically resistant coating for tank and can linings, laboratory equipment, etc.

It will be appreciated that the experienced formulator can vary proportions, type of epoxy resin, type of curing agent, type of filler, other modifiers, etc. in order to obtain the desired properties in the finished product.

Among the advantages available with the present invention are: (1) improved flexibility, (2) reduced viscosity, (3) reduced heat evolution during cure, (4) acceleration or retardation of cure depending upon type and concentration of modifier, (5) good recovery in cast pieces and (6) improved resistance to chemical attack in comparison with the conventional ester type plasticizer for epoxy formulations.

Numerous variations and modifications of the principles disclosed herein may be made without departing from the spirit of the present invention. Insofar as the variations and modifications are within the purview of the annexed claims they are to be considered a part of the present invention.

What is claimed is:

1. A cured resin composition which comprises the reaction product of a glycidyl ether having the general structural formula

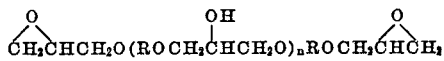

wherein $n$ has a value of from 0 to 10 and R is a radical selected from the group consisting of aromatic hydrocarbon radicals, alkylated aromatic hydrocarbon radicals, and hydroxyalkylene-substituted radicals, and an organic liquid material obtained from a plant belonging to the Anacardiaceae order selected from the group consisting of cashew nut shell liquid and acetylated cashew nut shell liquid, in the proportion of about 1 part to about 100 parts of said liquid material per 100 parts of said ether.

2. A process for making epoxy resin compositions which comprises curing a mixture of an epoxy resin which comprises the reaction product of a glycidyl ether having the general structural formula:

wherein $n$ has a value of from 0 to 10 and R is a radical selected from the group consisting of aromatic hydrocarbon radicals, alkylated aromatic hydrocarbon radicals, and hydroxyalkylene-substituted radicals, and an organic liquid material obtained from a plant belonging to the Anacardiaceae order selected from the group consisting of cashew nut shell liquid and acetylated cashew nut shell liquid, and a curing agent therefor.

3. A composition in accordance with claim 1, wherein the Anacardiaceae material is cashew nut shell liquid.

4. A composition in accordance with claim 1, wherein the Anacardiaceae material is acetyl cashew nut shell liquid.

5. A cured resin composition suitable for laminating applications and comprising the reaction product of about 100 parts of an epoxy resin of the general structural formula:

in which n has a value of from 0 to about 10, about 50 parts of cashew nut shell liquid and about 11 parts of triethylenetetramine.

6. A cured resin composition suitable for chemically resistant coating applications and comprising a solvent dispersion of about 100 parts of an epoxy resin of the general structural formula:

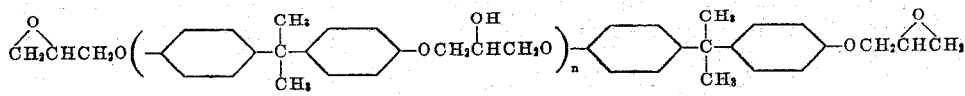

in which n has a value of from 0 to about 10, about 25 parts of acetylated cashew nut shell liquid and about 30 parts of diethylenetriamine.

References Cited in the file of this patent
UNITED STATES PATENTS

| | | |
|---|---|---|
| 2,500,449 | Bradley | Mar. 14, 1950 |
| 2,665,266 | Wasserman | Jan. 5, 1954 |
| 2,891,026 | Wasserman | June 16, 1959 |

FOREIGN PATENTS

| | | |
|---|---|---|
| 651,334 | Great Britain | Mar. 14, 1951 |

OTHER REFERENCES

Paint Technology, October 1945, pp. 249–253.